Figures 1, 2:
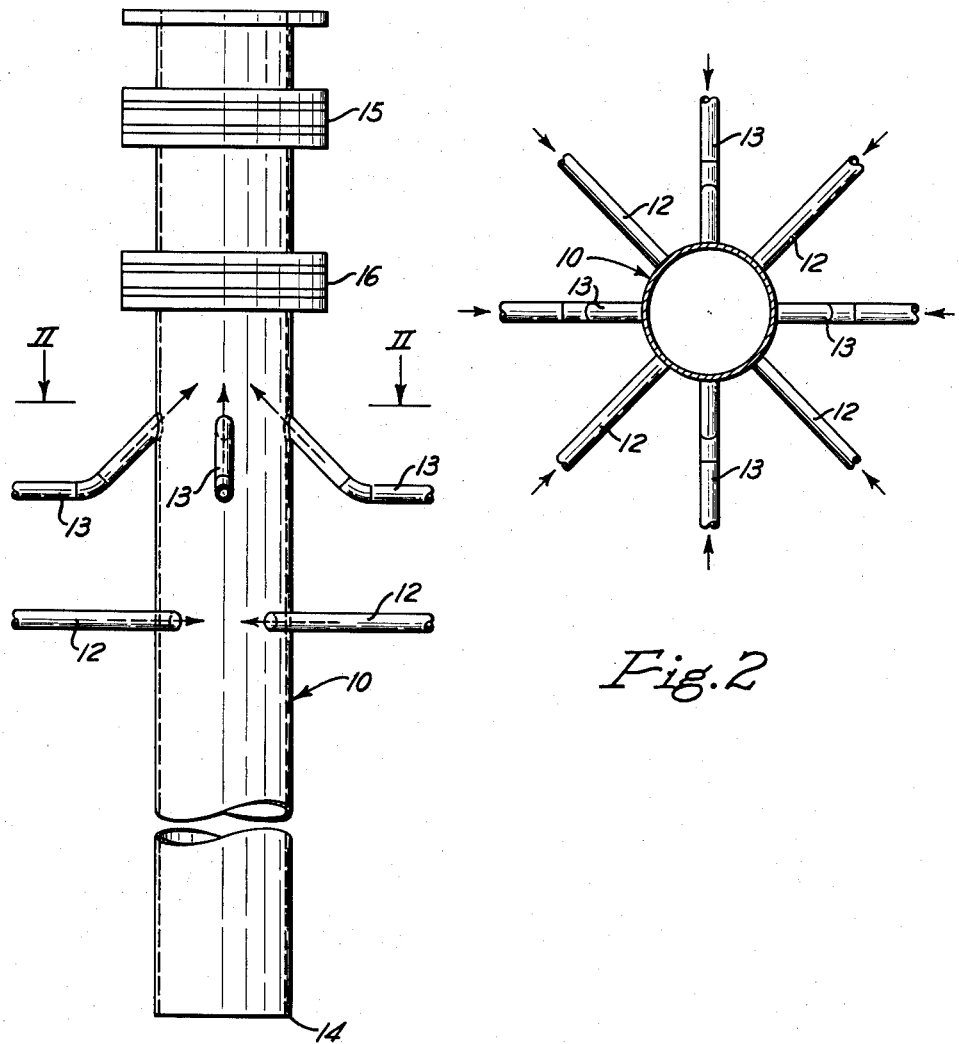

April 23, 1963 — E. W. SIEGER — 3,086,537

APPARATUS FOR HANDLING AND WETTING DUST

Filed June 8, 1961

INVENTOR.
EARL W. SIEGER
BY Donald G. Dalton
ATTORNEY

United States Patent Office 3,086,537
Patented Apr. 23, 1963

3,086,537
APPARATUS FOR HANDLING AND WETTING DUST
Earl W. Sieger, Newtown Township, Bucks County, Pa., assignor to United States Steel Corporation, a corporation of New Jersey
Filed June 8, 1961, Ser. No. 115,820
2 Claims. (Cl. 134—61)

This invention relates to an improved apparatus for handling and wetting dust or similar pulverulent material.

Although the invention is not thus limited, the apparatus is particularly useful for handling and wetting dust recovered from a blast furnace. Conventionally a blast furnace is equipped with a dust catcher which recovers fine dust from the off-gas. The dust collects in a bin or hopper from which it is removed and hauled away periodically. The dust must be wetted to form a sludge before it can be handled in the open. Most wetting apparatus with which I am familiar lack any satisfactory provision for handling and removing large foreign bodies, such as brickbats, which often accompany the dust. Commonly such apparatus includes some sort of gooseneck or trap which contains a turbulent pool of water for wetting the dust, but where foreign bodies also may lodge. These foreign bodies may block the entire apparatus and it may be extremely difficult to remove them.

An object of my invention is to provide an improved apparatus of simple construction which avoids goosenecks or other forms of trap where foreign bodies can lodge, yet effectively wets dust or the like and delivers the resulting sludge to a suitable receiver.

A more specific object is to provide an improved dust handling and wetting apparatus, the wetting chamber of which is in the form of a straight vertical pipe equipped with steam and water inlets, whereby foreign bodies can drop directly through with the dust and do not lodge.

In the drawing:

FIGURE 1 is a side elevational view of my dust handling and wetting apparatus; and FIGURE 2 is a horizontal section on line II—II of FIGURE 1.

My dust handling apparatus includes an elongated vertical pipe 10 of relatively large diameter (for example a foot or more). A plurality of water inlets 12 are connected to pipe 10 approximately midway of its height. I have illustrated four water inlets spaced 90° apart around the circumference of the pipe. The water inlets extend horizontally. A plurality of steam inlets 13 are connected to pipe 10 above the water inlets 12. I have also illustrated four steam inlets spaced 90° apart around the circumference of the pipe, but staggered with respect to the water inlets. The steam inlets slope upwardly preferably at 45° to the horizontal. Dust, together with any foreign bodies present, enters the top of pipe 10 from a conventional dust catcher or the like (not shown) and discharges through the open lower end 14 to a suitable receiver, such as a truck or railroad car (not shown). I equip pipe 10 with one or more wafer-type slide valves 15 and 16 located above the steam inlets 13 for controlling admission of dust. Normally I use only one of these valves (usually the lower) and leave the other open to serve as a stand-by for use while the first undergoes repairs. Since the dust is highly abrasive, frequent repairs may be necessary. I can equip the valves with any suitable electric, hydraulic or pneumatic operating means (not shown).

In operation, I close one of the valves 15 or 16 while I introduce an accumulation of dust to the upper end of pipe 10. I introduce water and steam under pressure to pipe 10 via the inlets 12 and 13. I open the valve 15 or 16, whereupon the dust drops through pipe 10 and is picked up by the counterflow of steam. Thus the flow of dust becomes highly turbulent, and this turbulence continues as the dust passes the water inlets 12, whereby the water effectively wets the dust to form a sludge. The required flow of steam and water vary, depending on pressure conditions at the source of the dust (for example a blast furnace) and the quantity of dust, but I have attained good results with 1 inch water lines and 1 inch steam lines spaced as illustrated, and with steam at 50 p.s.i.g. and water at 70 p.s.i.g.

From the foregoing description it is seen that my invention affords a dust handling and wetting apparatus which is of simple construction yet fully effective for the purpose. There are no impediments to passage of foreign bodies directly through the apparatus. Thus such bodies discharge immediately from the lower end 13 along with the sludge.

While I have shown and described only a single embodiment of my invention, it is apparent that modifications may arise. Therefore, I do not wish to be limited to the disclosure set forth but only by the scope of the appended claims.

I claim:

1. A dust handling apparatus comprising an elongated vertical pipe, a plurality of horizontal water inlets connected to the mid portion of said pipe and uniformly spaced around the circumference thereof, a plurality of upwardly directed steam inlets connected to said pipe above said water inlets and also uniformly spaced around the circumference thereof but staggered with respect to said water inlets, and a wafer-type slide valve in the upper portion of said pipe above said steam inlets for controlling admission of dust to the pipe, said steam inlets supplying steam in counterflow relation to dust admitted via said valve to produce turbulence in the dust, said water inlets supplying water for wetting the turbulent dust, the lower end of said pipe being open for discharging dust wetted to form a sludge, said water and steam inlets terminating at the pipe wall leaving said pipe unobstructed to enable foreign bodies with the dust to fall directly through to the open lower end.

2. An apparatus as defined in claim 1 comprising a second wafer-type slide valve above said steam inlets, said second valve being normally open but available as a stand-by when said first named valve undergoes repairs.

References Cited in the file of this patent
UNITED STATES PATENTS

| | | |
|---|---|---|
| 903,150 | Braemer | Nov. 3, 1908 |
| 998,994 | Smith | July 25, 1911 |
| 2,075,221 | Palenzuela | Mar. 30, 1937 |